United States Patent
Binek et al.

(10) Patent No.: US 12,421,872 B2
(45) Date of Patent: Sep. 23, 2025

(54) SPRING DAMPING FOR BEARING COMPARTMENT

(71) Applicant: RTX Corporation, Farmington, CT (US)

(72) Inventors: Lawrence A. Binek, Glastonbury, CT (US); Christopher D. Ramsey, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/499,376

(22) Filed: Nov. 1, 2023

(65) Prior Publication Data

US 2024/0151160 A1    May 9, 2024

Related U.S. Application Data

(60) Provisional application No. 63/423,270, filed on Nov. 7, 2022.

(51) Int. Cl.
| | |
|---|---|
| *F01D 25/16* | (2006.01) |
| *B22F 5/00* | (2006.01) |
| *B22F 10/00* | (2021.01) |
| *B33Y 10/00* | (2015.01) |
| *B33Y 80/00* | (2015.01) |
| *F16C 35/02* | (2006.01) |
| *B64D 27/10* | (2006.01) |

(52) U.S. Cl.
CPC ............ *F01D 25/164* (2013.01); *B22F 5/009* (2013.01); *B22F 10/00* (2021.01); *B33Y 10/00* (2014.12); *B33Y 80/00* (2014.12); *F16C 35/02* (2013.01); *B22F 2998/10* (2013.01); *B64D 27/10* (2013.01); *F05D 2230/60* (2013.01); *F05D 2240/50* (2013.01); *F16C 2360/23* (2013.01)

(58) Field of Classification Search
CPC ...................................................... F01D 25/164
See application file for complete search history.

(56) References Cited

U.S. PATENT DOCUMENTS

| | | | |
|---|---|---|---|
| 9,500,230 B2 | 11/2016 | Hiller et al. | |
| 9,850,814 B2 | 12/2017 | Grogg | |
| 9,869,205 B2 | 1/2018 | Ganiger et al. | |
| 9,926,975 B2 | 3/2018 | Smedresman et al. | |
| 10,458,277 B1 | 10/2019 | Von Berg | |
| 10,480,572 B2 * | 11/2019 | Smedresman | F01D 25/183 |
| 11,313,248 B2 | 4/2022 | Demitraszek, Sr. | |

(Continued)

FOREIGN PATENT DOCUMENTS

| | | |
|---|---|---|
| CN | 114483801 A | 5/2022 |
| EP | 3929408 A1 | 12/2021 |
| FR | 3096110 A1 | 11/2020 |

OTHER PUBLICATIONS

EP Search Report Issued Mar. 19, 2024 in U421872EP, 8 pages.

*Primary Examiner* — Justin D Seabe
(74) *Attorney, Agent, or Firm* — CANTOR COLBURN LLP

(57) ABSTRACT

According to an aspect, a bearing compartment includes a housing integrally formed with a spring configured to deform in response to a force. The housing includes an overhang region that is supported by the spring during an additive manufacturing build process. The spring includes a plurality of struts that extend axially within the housing.

17 Claims, 4 Drawing Sheets

(56) References Cited

U.S. PATENT DOCUMENTS

| | | | |
|---|---|---|---|
| 11,371,435 B2* | 6/2022 | Bessy | F01D 21/00 |
| 2021/0033003 A1* | 2/2021 | Ovaere | B22F 10/28 |
| 2021/0062679 A1 | 3/2021 | Marquie et al. | |

* cited by examiner

SPRING DAMPING FOR BEARING COMPARTMENT

CROSS-REFERENCE TO RELATED APPLICATIONS

This application claims the benefit of U.S. Provisional Application No. 63/423,270 filed Nov. 7, 2022, the disclosure of which is incorporated herein by reference in its entirety.

BACKGROUND

Exemplary embodiments of the present disclosure relate generally to gas turbine engines and, in one embodiment, to a spring for damping in a bearing compartment of a gas turbine engine.

In a gas turbine engine, air is compressed in a compressor and compressor air is then mixed with fuel and combusted in a combustor to produce a high-temperature and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotation of a propeller/fan or to produce electricity in a generator.

Certain parts, such as a bearing compartment, in a gas turbine engine need damping between components. When bearing compartments are assembled with a large number of individually manufactured parts, there can be gaps in some locations to allow an assembly tolerance. The gaps can also be due to individual manufacturing tolerances stacking up between components. Gap areas can result in different stress levels across surfaces and upon edges of some components. Gaps can also allow components to rotate during the assembly process, which may make alignment difficult. Further, traditional manufacturing techniques of casting and machining of parts can inherently limit the level of component design complexity due to tooling constraints and other factors.

BRIEF DESCRIPTION

According to an aspect, a bearing compartment includes a housing integrally formed with a spring configured to deform in response to a force. The housing includes an overhang region that is supported by the spring during an additive manufacturing build process. The spring includes a plurality of struts that extend axially within the housing.

In addition to one or more of the features described above or below, or as an alternative, further embodiments may include where the spring is a squirrel cage spring, and a centerline of the struts extends axially in parallel to an axis of rotation defined within a central cavity of the bearing compartment.

In addition to one or more of the features described above or below, or as an alternative, further embodiments may include where the spring includes a shell with an internal lattice structure within the struts.

In addition to one or more of the features described above or below, or as an alternative, further embodiments may include where the shell includes one of more weep holes that allow additive manufacturing powder to be removed from within the internal lattice structure.

In addition to one or more of the features described above or below, or as an alternative, further embodiments may include where the internal lattice structure is a triply periodic minimal surfaces structure forming a gyroid.

In addition to one or more of the features described above or below, or as an alternative, further embodiments may include where two or more of the struts are canted.

In addition to one or more of the features described above or below, or as an alternative, further embodiments may include where the spring includes a keyway.

According to an aspect, a gas turbine engine includes a compressor section, a turbine section, a shaft coupled to the compressor section and the turbine section, and a bearing system configured to support rotation of the shaft. The bearing system includes a bearing compartment having a housing integrally formed with a spring configured to deform in response to a force. The housing includes an overhang region that is supported by the spring during an additive manufacturing build process. The spring includes a plurality of struts that extend axially within the housing.

In addition to one or more of the features described above or below, or as an alternative, further embodiments may include where the spring includes a keyway to support positioning one or more other components of the bearing compartment.

According to an aspect, a method of manufacturing a bearing compartment includes additively manufacturing a lower portion of a housing of the bearing compartment including a spring radially inward of the housing, additively manufacturing a plurality of struts of the spring to extend axially within the housing, and additively manufacturing an upper portion of the housing extending from the lower portion, where the upper portion includes an overhang region that is integrally formed with the spring.

In addition to one or more of the features described above or below, or as an alternative, further embodiments may include where the spring is additively manufactured as a squirrel cage spring, and a centerline of the struts extends axially in parallel to an axis of rotation defined within a central cavity of the bearing compartment.

In addition to one or more of the features described above or below, or as an alternative, further embodiments may include where the spring includes a shell with an internal lattice structure within the struts, the shell includes one of more weep holes that allow additive manufacturing powder to be removed from within the internal lattice structure, and the internal lattice structure is a triply periodic minimal surfaces structure forming a gyroid.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
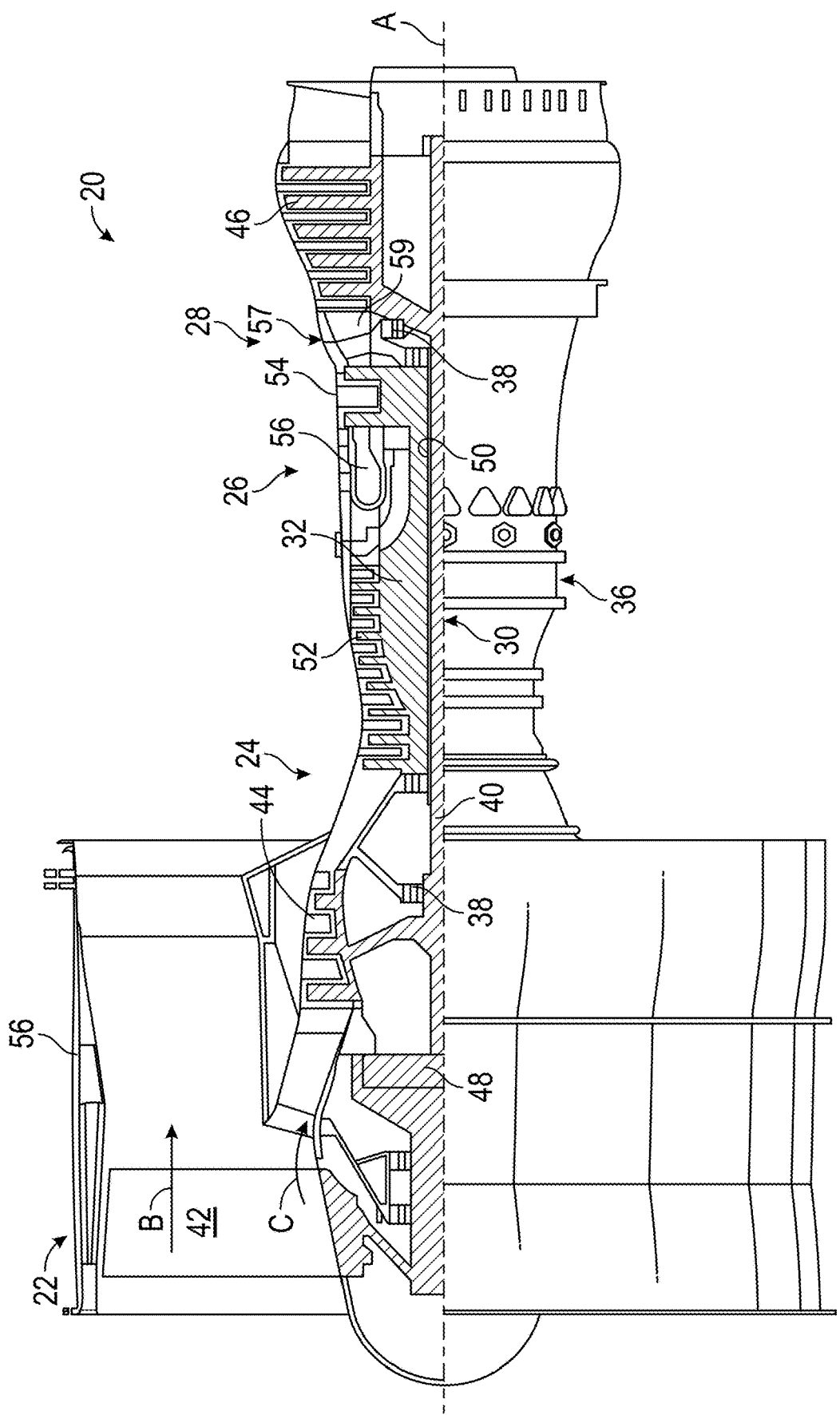
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
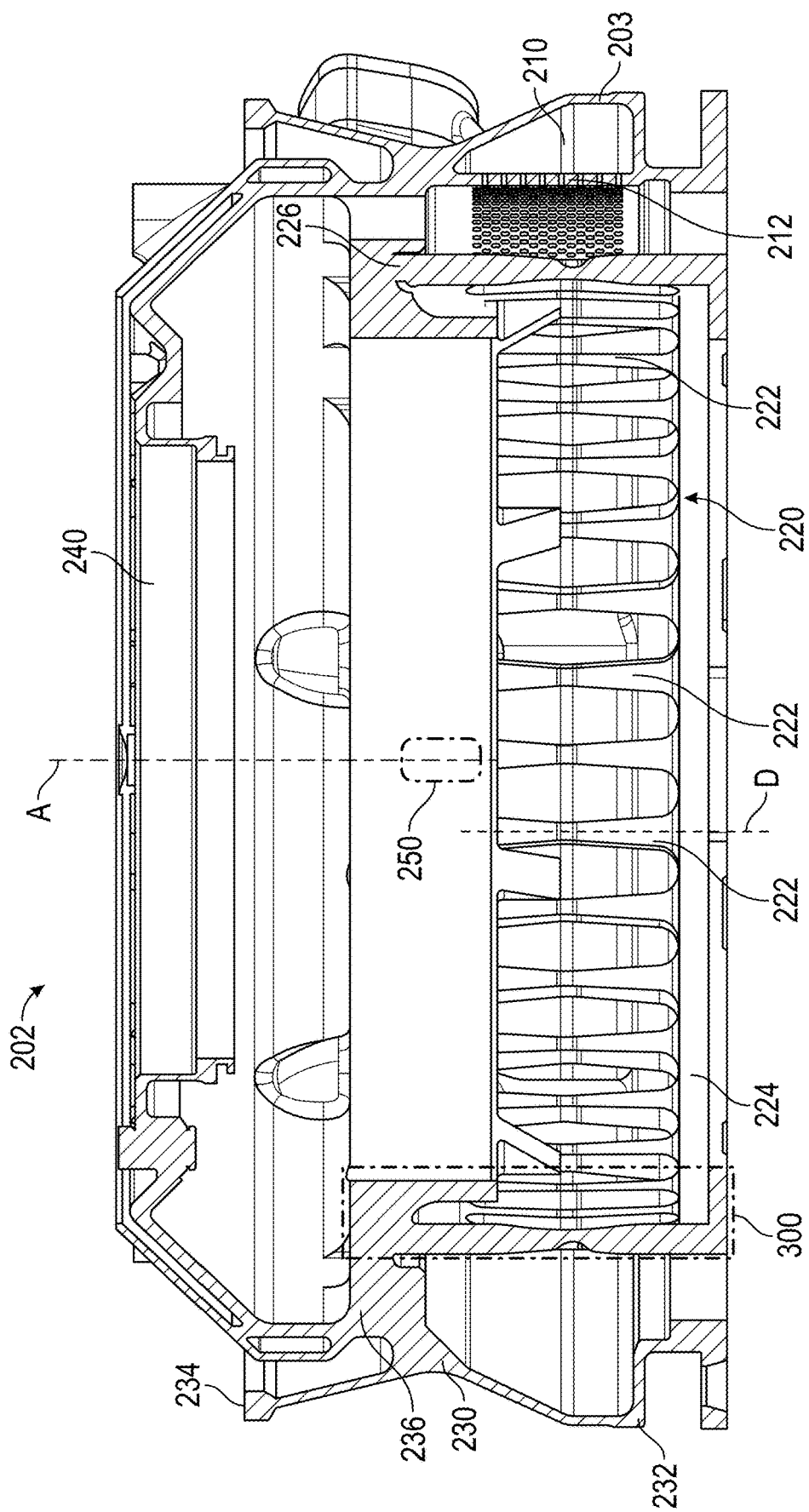
FIG. 2 is a side view of a bearing compartment with a spring in accordance with embodiments.

With continued reference to FIG. 1 and with additional reference to FIGS. 2-6, a bearing compartment 202 of the gas turbine engine 20 of FIG. 1 can be additively manufactured and include a number of features with a complex geometry. The bearing compartment 202 can be part of the bearing systems 38 to support rotation of one or more shafts, such as the inner shaft 40 or the outer shaft 50. In the example of FIG. 2, the bearing compartment 202 includes an outer annular manifold 210, which can be integrally formed between an interior surface 203 of the bearing compartment 202 and a perforated wall 212 to receive pressurized oil. The perforated wall 212 can be substantially cylindrical and is formed to define a lattice array of holes that are respectively communicative with a second interior cavity.

The bearing compartment 202 also includes a spring 220 integrally formed with a housing 230 of the bearing compartment 202. The housing 230 can include a lower portion 232 and an upper portion 234. Rather than separately manufacturing the lower portion 232 and upper portion 234, the housing 230 can be monolithically formed through an additive manufacturing process. The interior surface 203 can be part of the lower portion 232 of the housing 230.

The upper portion 234 of the housing 230 can include an overhang region 236 that is supported by the spring 220 during an additive manufacturing build process. For example, the bearing compartment 202 can be manufactured using a powder bed fusion process, e.g., laser or electron beam based, to progressively build the housing 230 from the lower portion 232 to the upper portion 234 while also building the spring within an interior of the housing 230. Forming the spring 220 integrally with the housing 230 can enhance structural stability and prevent the spring 220 from rotating relative to the housing 230 during assembly of the bearing compartment 202.

The spring 220 can include a plurality of struts 222 that extend axially within the housing 230. The spring 220 can be a squirrel cage spring, and a centerline D of the struts 222 can extend axially in parallel to an axis of rotation (e.g., engine central longitudinal axis A) defined within a central cavity 240 of the bearing compartment 202. The struts 222 can extend between a first annular support member 224 (e.g., a lower support) and a second annular support member 226 (e.g., an upper support).

In some embodiments, the spring 220 can include a keyway 250 that provides a clocking feature to support positioning one or more other components of the bearing compartment 202. For example, the keyway 250 can align with a bearing sleeve, oil system components, or other such components of the bearing compartment 202. Since the spring 220 is integrally formed with the bearing compartment 202, the keyway 250 position is at a fixed position relative to other reference locations within the bearing compartment 202. In contrast, if the spring 220 was a separately manufactured component relative to the bearing compartment 202, the positioning of the keyway 250 may be less precise.

Figure 3:
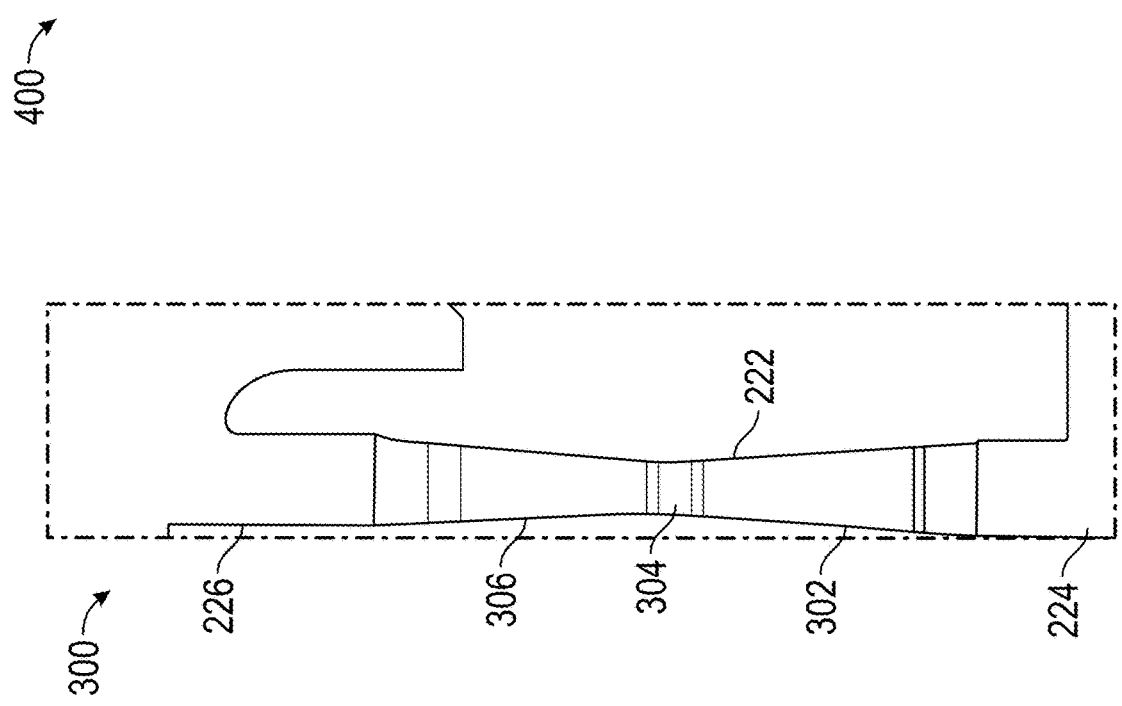
FIG. 3 is an enlarged view of the portion of FIG. 2 in accordance with embodiments.

FIG. 3 depicts additional aspects of a portion 300 of the spring 220 to better illustrate a strut 222 between the first annular support member 224 and the second annular support member 226. The body of the strut 222 can be canted such the cross-sectional area of the strut 222 decreased when transitioning from the first annular support member 224 through a lower portion 302 of the strut 222 to a central portion 304 of the strut 222. The cross-sectional area of the strut 222 can increase when transitioning from the central portion 304 through an upper portion 306 of the strut to the second annular support member 226. This tapering or canting can be designed to provide a desired amount of damping such that the spring 220 is configured to deform in response to a force with a predetermined amount of deflection.

Figure 5:
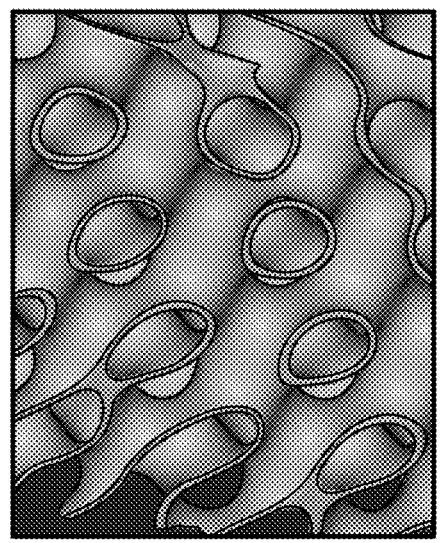
FIG. 5 is a detailed view of the structure of FIG. 4 in accordance with embodiments.
Figure 4:
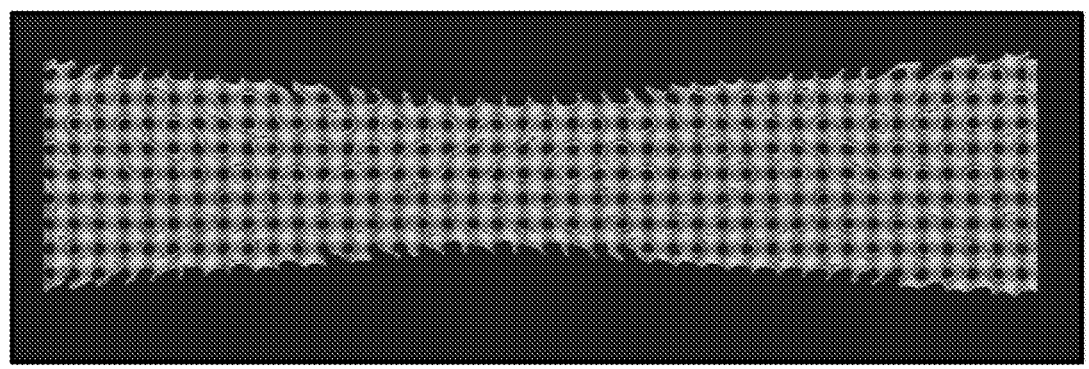
FIG. 4 depicts an example of a triply periodic minimal surfaces structure that can be formed in a spring strut in accordance with embodiments.

In accordance with embodiments and as shown in FIGS. 4 and 5, the interior of the struts 222 can be designed with an internal lattice structure 400. For instance, as seen in FIG. 3 an outer portion or shell of the strut 222 can be solid, while an interior potion of the strut 222 can have the internal lattice structure 400. The internal lattice structure 400 can be designed to provide a desired amount of stiffness while also reducing the weight of each strut 222 as compared to an embodiment of a solid strut. In embodiments, the internal lattice structure 400 can be a triply periodic minimal surfaces structure comprising a gyroid, e.g., an infinitely connected triply periodic minimal surface.

Figure 6:
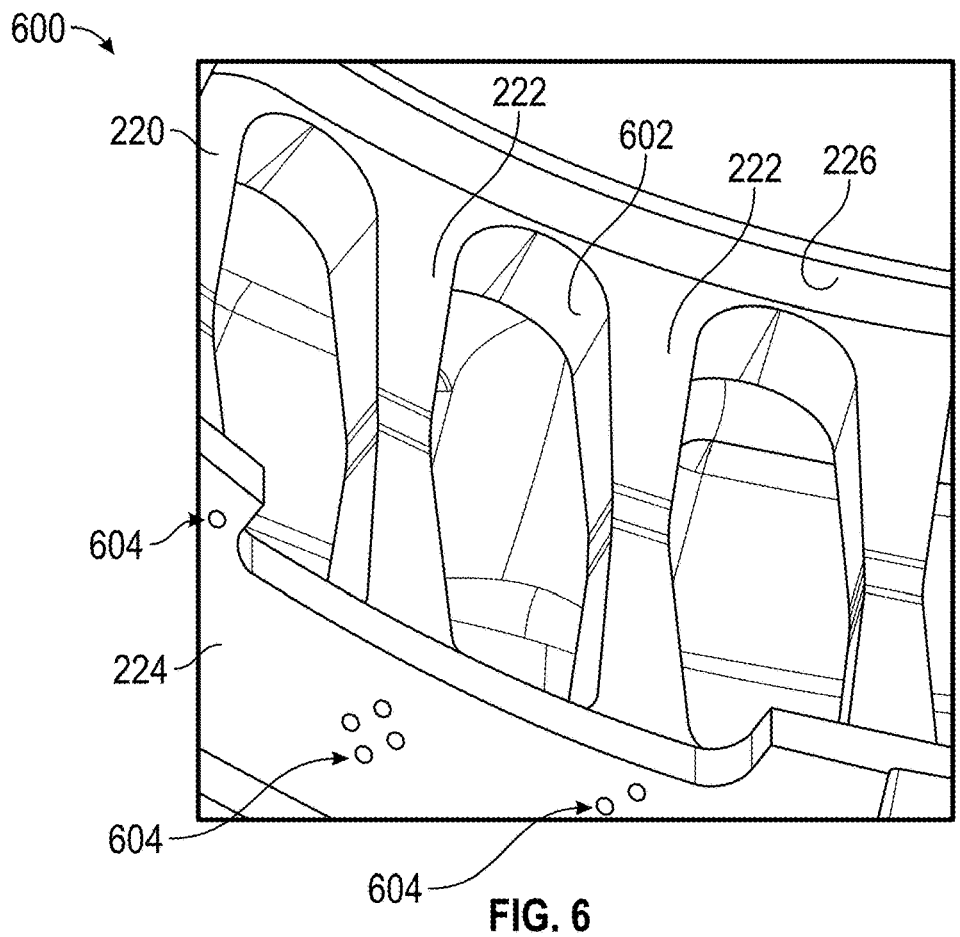
FIG. 6 is a perspective view of a portion of the spring of FIG. 2 in accordance with embodiments.

FIG. 6 is a perspective view of a portion 600 of the spring of FIG. 2 in accordance with embodiments. In the example of FIG. 6, a blending radius 602 is illustrated between a pair of struts 222 proximate to the second annular support member 226. The blending radius 602 radius can be determined to minimize an unsupported area between the struts 222. The example of FIG. 6 also depicts weep holes 604 that can be incorporated into the shell of the spring 220 to allow additive manufacturing powder to be removed from within the internal lattice structure 400. Although the weep holes 604 are depicted in the first annular support member 224, the weep holes 604 can be placed anywhere on the spring 220 to assist in powder removal where non-solid structures are formed within the spring 220. Where the spring 220 is a solid structure, the weep holes 604 can be omitted.

Figure 7:
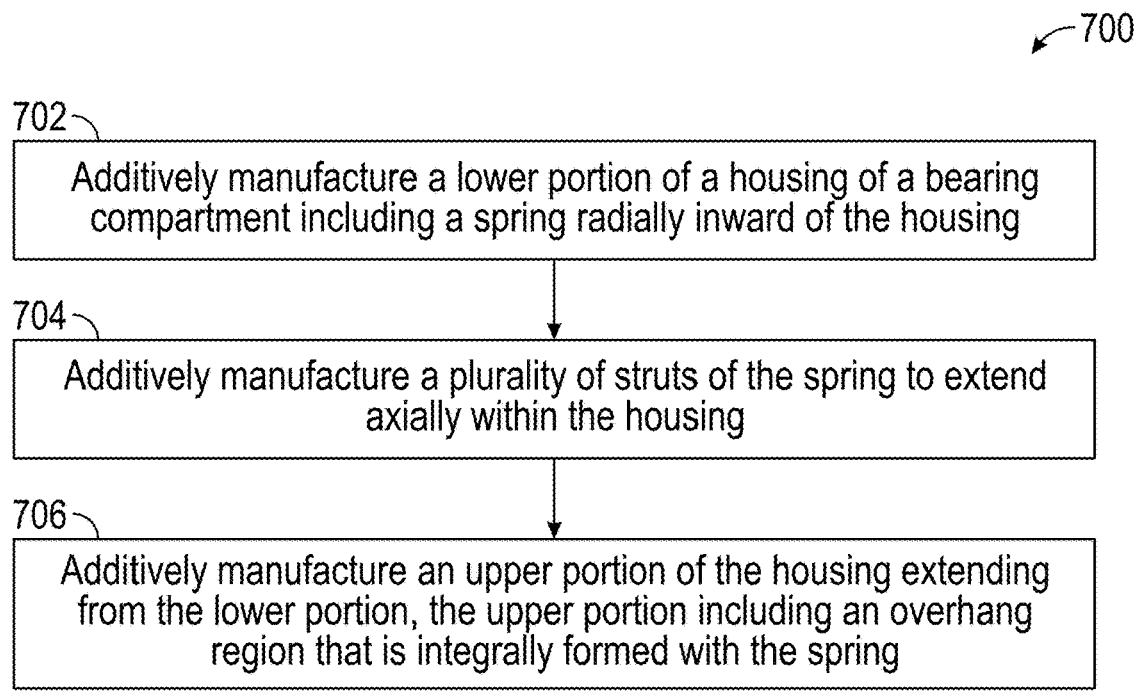
FIG. 7 is a flow diagram illustrating a method of manufacturing a bearing compartment in accordance with embodiments.

With reference to FIG. 7, a method 700 of manufacturing a bearing compartment, such as the bearing compartment 202 described above, is provided. At block 702, the method 700 includes additively manufacturing a lower portion 232 of a housing 230 of a bearing compartment 202 including a spring 220 radially inward of the housing 230. At block 704, the method 700 includes additively manufacturing a plurality of struts 222 of the spring 220 to extend axially within the housing 230. At block 706, the method 700 includes additively manufacturing an upper portion 234 of the housing 230 extending from the lower portion 232, where the upper portion 234 includes an overhang region 236 that is integrally formed with the spring 220.

In some embodiments, the spring 220 is additively manufactured as a squirrel cage spring, and a centerline D of the struts 222 extends axially in parallel to an axis of rotation defined within a central cavity 240 of the bearing compartment 202. In some embodiments, the spring 220 includes a shell with an internal lattice structure 400 within the struts 222. The shell can include one of more weep holes 604 that allow additive manufacturing powder to be removed from within the internal lattice structure 400, and the internal lattice structure 400 can be a triply periodic minimal surfaces structure comprising a gyroid. In some embodiments, two or more of the struts 222 are canted and may taper to a central portion 304. In some embodiments, the spring 220 includes a keyway 250.

Benefits of the features described herein include a spring formed integrally with the bearing compartment through the use of additive manufacturing that allows for complex geometries. Further, the spring can provide a support structure for manufacturing overhanging portions of the bearing compartment housing and thus also assists in allowing the upper portion and lower portion of the housing to be additively manufactured as a single monolithic component.

The term "about" is intended to include the degree of error associated with measurement of the particular quantity based upon the equipment available at the time of filing the application. Terms such as "upper" and "lower" are used for purposes of explanation and the designation as such can be altered depending upon component orientation.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bearing compartment comprising:
a housing including a lower portion and an upper portion extending from the lower portion, wherein the housing is integrally formed with a spring configured to deform in response to a force, wherein the lower portion includes the spring radially inward of the housing, wherein the upper portion comprises an overhang region that is supported by and integrally formed with the spring, the spring comprises a plurality of struts that extend axially within the housing, and the spring comprises a shell with an internal lattice structure within the struts.

2. The bearing compartment of claim 1, wherein the spring is a squirrel cage spring, and a centerline of the struts extends axially in parallel to an axis of rotation defined within a central cavity of the bearing compartment.

3. The bearing compartment of claim 1, wherein the shell comprises one of more weep holes that allow additive manufacturing powder to be removed from within the internal lattice structure.

4. The bearing compartment of claim 3, wherein the internal lattice structure is a triply periodic minimal surfaces structure comprising a gyroid.

5. The bearing compartment of claim 1, wherein two or more of the struts are canted.

6. The bearing compartment of claim 1, wherein the spring comprises a keyway.

7. A gas turbine engine comprising:
a compressor section;
a turbine section;
a shaft coupled to the compressor section and the turbine section; and
a bearing system configured to support rotation of the shaft, the bearing system comprising a bearing compartment having a housing including a lower portion and an upper portion extending from the lower portion, wherein the housing is integrally formed with a spring configured to deform in response to a force, wherein the lower portion includes the spring radially inward of the housing, wherein the upper portion comprises an overhang region that is supported by and integrally formed with the spring, the spring comprises a plurality of struts that extend axially within the housing, and the spring comprises a shell with an internal lattice structure within the struts.

8. The gas turbine engine of claim 7, wherein the spring is a squirrel cage spring, and a centerline of the struts extends axially in parallel to an axis of rotation of the shaft within a central cavity of the bearing compartment.

9. The gas turbine engine of claim 7, wherein the shell comprises one of more weep holes that allow additive manufacturing powder to be removed from within the internal lattice structure.

10. The gas turbine engine of claim 9, wherein the internal lattice structure is a triply periodic minimal surfaces structure comprising a gyroid.

11. The gas turbine engine of claim 7, wherein two or more of the struts are canted.

12. The gas turbine engine of claim 7, wherein the spring comprises a keyway to support positioning one or more other components of the bearing compartment.

13. A method of manufacturing a bearing compartment, the method comprising:
additively manufacturing a lower portion of a housing of the bearing compartment including a spring radially inward of the housing;
additively manufacturing a plurality of struts of the spring to extend axially within the housing; and
additively manufacturing an upper portion of the housing extending from the lower portion, the upper portion including an overhang region that is integrally formed with the spring, and the spring comprises a shell with an internal lattice structure within the struts.

14. The method of claim 13, wherein the spring is additively manufactured as a squirrel cage spring, and a centerline of the struts extends axially in parallel to an axis of rotation defined within a central cavity of the bearing compartment.

15. The method of claim 13, wherein the shell comprises one of more weep holes that allow additive manufacturing powder to be removed from within the internal lattice structure, and the internal lattice structure is a triply periodic minimal surfaces structure comprising a gyroid.

16. The method of claim 13, wherein two or more of the struts are canted.

17. The method of claim 13, wherein the spring comprises a keyway.

* * * * *